United States Patent
You et al.

[11] Patent Number: 6,062,663
[45] Date of Patent: *May 16, 2000

[54] DOOR FOR COMPUTER CASE

[75] Inventors: Roger You, Cerritos; David Chen, Agoura Hills; Matthew Herron, Palo Alto; Jacques Louis Gagne, Los Altos; Dore Chin Mark, San Francisco; Kevin Christian Coullahan, San Jose; Tony Hieu Nguyen, Stanton; Brian Keith Williams, Woodland Hills, all of Calif.

[73] Assignee: NEC Corporation Japan, Tokyo, Japan

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/971,994

[22] Filed: Nov. 17, 1997

[51] Int. Cl.$^7$ .................................................. H05K 7/18
[52] U.S. Cl. ..................... 312/223.2; 312/306; 49/451; 49/336; 292/189; 292/DIG. 11; 439/911; 439/929
[58] Field of Search ................................ 361/727, 683, 361/685; 312/310, 312, 304, 306, 350, 293.1, 223.2, 223.1, 107, 109, 110, 111, 222, 278, 279; 49/451, 407, 336, 362; 292/136, 189, 183, DIG. 11; 429/97, 100; 439/911, 929, 136

[56] References Cited

U.S. PATENT DOCUMENTS

| | | |
|---|---|---|
| 1,140,770 | 5/1915 | Schmidt et al. .......................... 49/362 |
| 2,463,250 | 3/1949 | Curtiss, Jr. ........................... 312/312 X |
| 3,489,480 | 1/1970 | Slouka ..................................... 312/312 |
| 3,788,006 | 1/1974 | Teggelaar et al. ..................... 49/451 X |
| 4,501,460 | 2/1985 | Sisler .................................... 361/683 X |
| 4,602,164 | 7/1986 | Gore, III et al. ................... 361/683 X |
| 4,728,160 | 3/1988 | Mondor et al. ...................... 361/685 X |
| 4,729,614 | 3/1988 | Nadler et al. ........................ 312/310 X |
| 4,804,238 | 2/1989 | Bischof et al. ....................... 312/138.1 |
| 5,138,525 | 8/1992 | Rodriguez .......................... 312/223.2 X |
| 5,169,218 | 12/1992 | Chu ....................................... 312/223.2 |
| 5,236,259 | 8/1993 | Ryan et al. ....................... 312/223.2 X |
| 5,251,105 | 10/1993 | Kobayashi et al. ...................... 361/683 |
| 5,292,259 | 3/1994 | Sheldrake et al. .................. 439/911 X |
| 5,442,514 | 8/1995 | Hopkins ............................... 361/683 X |
| 5,593,219 | 1/1997 | Ho ..................................... 312/265.5 X |
| 5,816,672 | 10/1998 | La Pointe et al. .................... 312/223.2 |
| 5,820,235 | 10/1998 | Tsai ....................................... 312/223.2 |

Primary Examiner—Janet M. Wilkens
Attorney, Agent, or Firm—Katten Muchin Zavis

[57] ABSTRACT

A door for a computer case is provided which can be moved to a blocking position for blocking access to bays and/or drives of the case. The door can be attached to the case by a slide connection for sliding it along the front of the case between its blocking and accessing positions. In the preferred form, the case is a vertical tower type of case and the door is preloaded on track guides so that when it is raised such as to the blocking position it will not fall back to the accessing position under the influence of its own weight. A gear drive can be provided between the door and housing to provide for smooth manual sliding of the door to readily allow the door to be pushed to overcome the frictional resistance provided by the preload without hang ups in the track guides.

14 Claims, 9 Drawing Sheets

DOOR FOR COMPUTER CASE

FIELD OF THE INVENTION

The invention relates to a door for a computer such as a personal computer or the like.

BACKGROUND OF THE INVENTION

Typical cases for personal computers generally are either of the horizontal desk top variety for being placed in a horizontal orientation on a support surface such as a desk top, or of a vertical tower type design that are for being placed in a vertical orientation on a support surface, for instance on the ground such as below a desk. With the desk top models, the input keyboard can be placed on top of the case with the monitor adjacent thereto either on the case or on the desk to conserve desk space. As is apparent, this presents a fairly bulky and inconvenient arrangement.

In an effort to address this problem, desks have been provided with retractable computer supports which can be extended out during use and retracted back under the desk for storage to keep the case and keyboard off the desk top. However, this solution can be unsatisfactory in that the support has to be robust enough to support the weight of the case, and there has to be sufficient room under the desk to accommodate both the case and keyboard on the retracted support. In fact, what typically occurs is that the desk top case is placed on the ground somewhere close to or beneath the desk so as to remove it as an obstacle on the desk top. Placing these desk top cases flat on the ground makes drive bays of the case much more difficult to access due to their close proximity to the ground. Accordingly, users tend to turn these desk top computer cases on end so that the other end having the drive bays adjacent thereto is higher off the ground providing better access to the bays and any drives therein than if the case was laid flat on the ground. In this regard, vertical tower cases have been developed which are specifically designed to be placed in an upstanding vertical orientation with one of their ends in engagement with the ground and with their bay or bays, and any associated drives situated towards the top of the case so that they are better suited than the desk top cases for being placed on the ground under or around a desk.

While removing the computer case off of the desk and placing it on the ground solves the problem relating to insufficient desk space, it still creates other shortcomings in that the bays that are provided in the case either equipped with drive units or adapted to removably receive drive units therein for mass storage devices such as floppy disks, CD roms, and tape drives are made more difficult to access. This is true even in desk top cases stood on end and vertical tower types of computer cases which are normally no higher than two or three feet tall. Thus, depending on what the case placement dictates, the user will still need to reach below or around their desk or move their chair or get up and walk around to remove, replace, or exchange these devices in the drives in the case bays. Accordingly, there is a need for a computer case that allows it to be placed in a location other than on the desk top and in particular on the ground below or around the desk while still permitting for easy access to the bays and the drives that are in the case bays. In particular, it is desirable that those drives that are dedicated to devices that are interchanged on a frequent basis such as floppy disks and CD roms be made more accessible than they are currently when they are in drives in bays formed in a case that is placed on the ground.

As mentioned above, the cases for personal computers usually have bays for receiving disk drive units therein. These bays have an access slot through which the disk is slid in and out of the drive unit attached in the bay. As such, the front of the drive unit including the access slot is exposed and visible on the exterior face of the case which can create an undesirable aesthetic appearance as the bay and associated drive interrupt the continuity of the front face of the computer case. In addition, the drive unit may often be of a different color than the remainder of the case contributing to an overall appearance of the case that is less than appealing. A more serious problem is that with the case placed on the ground, either open bays or access slots of the drives placed in the bays are now no longer raised on a desk surface requiring the user to reach down to insert disks into the respective drives in an inconvenient fashion.

SUMMARY OF THE INVENTION

In accordance with the present invention, a door for a computer case is provided which can be moved to a blocking position for blocking access to bays and/or drives of the case. The door can be attached to the case by a slide connection for sliding it along the front of the case between its blocking and accessing positions. In the preferred form, the case is a vertical tower type of case and the door is preloaded on track guides so that when it is raised such as to the blocking position it will not fall back to the accessing position under the influence of its own weight. A gear drive can be provided between the door and housing to provide for smooth manual sliding of the door to readily allow the door to be pushed to overcome the frictional resistance provided by the preload without hang ups in the track guides.

BRIEF DESCRIPTION OF THE DRAWINGS

FIG. 4a is a perspective view of a bezel for the modular drive bay unit;

FIG. 4b is a bottom plan view of the bezel of FIG. 4a;

FIG. 5a is a perspective view of a base of the modular drive bay unit;

FIG. 5b is a bottom plan view of the drive bay unit base of FIG. 5a;

FIG. 5c is a side elevational view of the drive bay unit base of FIGS. 5a and 5b;

FIG. 7b is a side elevational view of the latch operator for FIG. 7a;

FIG. 11a is a front perspective view of a slidable door of the case;

FIG. 11b is a rear perspective view of the slidable door of FIG. 11a;

FIG. 11c is a side elevational view partially in section of the slidable door of FIGS. 11a; and 11b;

FIG. 12a is a front elevational view of a lower grill member of the case;

FIG. 12b is a top plan view of the grill member of FIG. 12a showing the curvature thereof;

DETAILED DESCRIPTION OF THE PREFERRED EMBODIMENT

Figure 1:
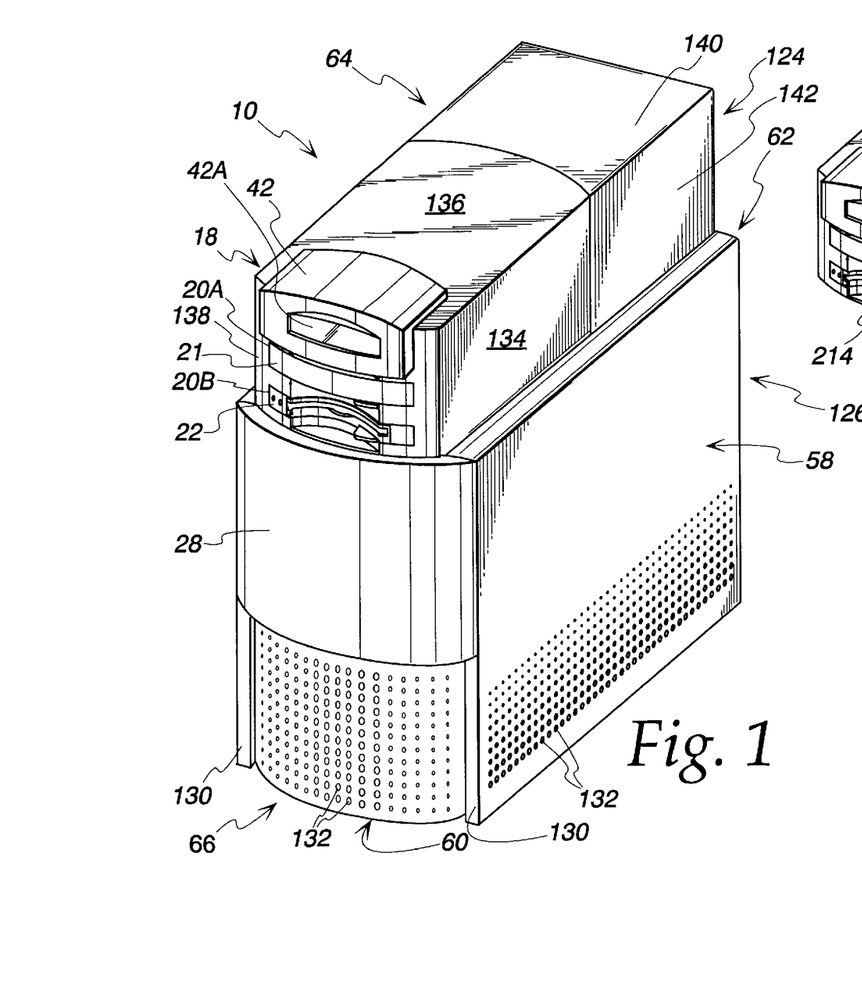
FIG. 1 is a perspective view of the case in accordance with the present invention showing a removable multiple drive bay unit attached to the case.
Figure 2:
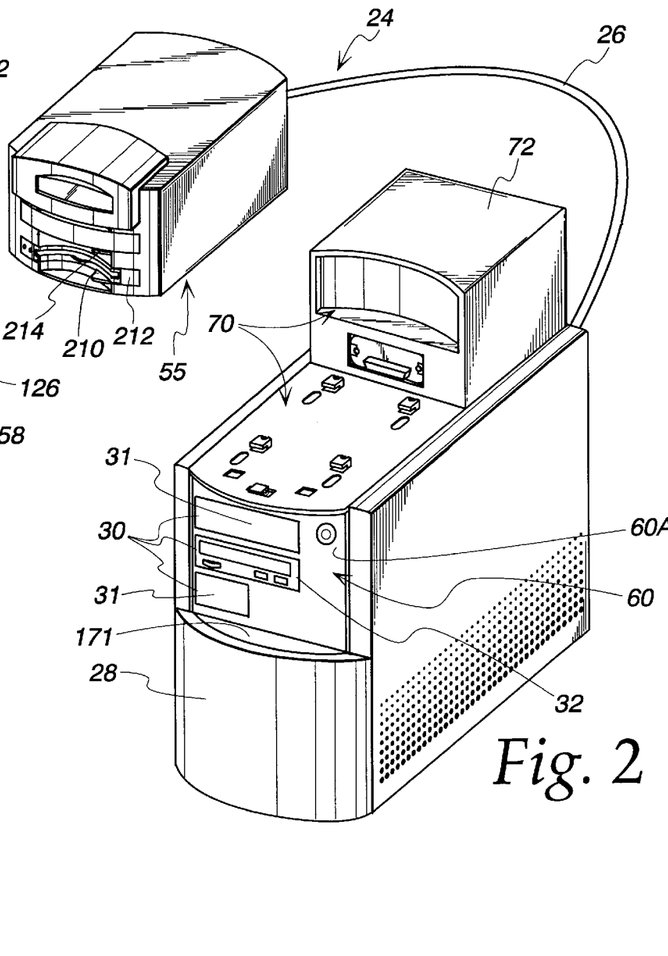
FIG. 2 is a perspective view of the case of FIG. 1 showing the modular drive unit detached from the case and electrically connected thereto via cable link with a sliding door opened to expose drive bays of the case.
Figure 3:
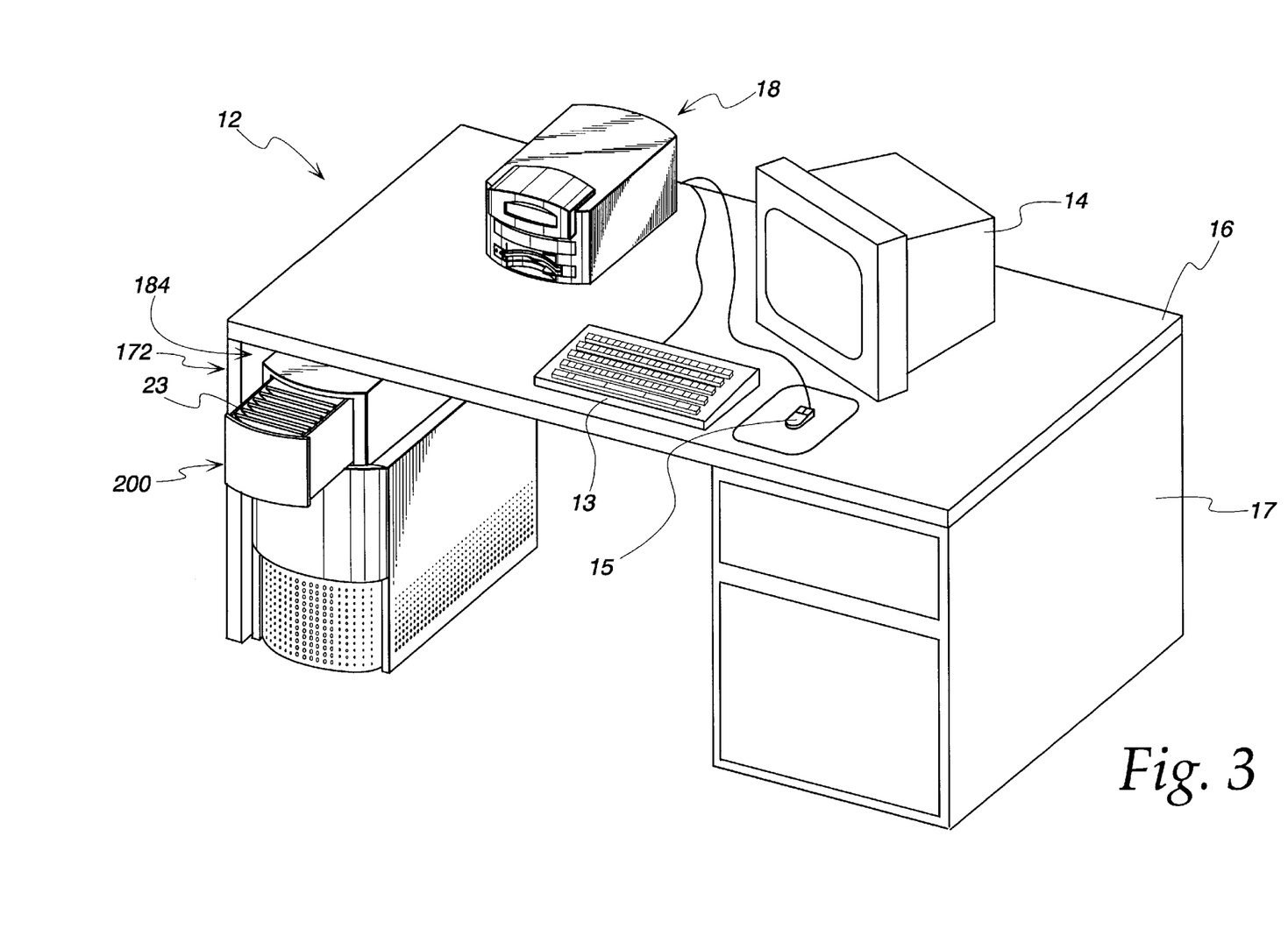
FIG. 3 is a perspective view of the case utilized with a personal computer showing the detachable drive unit placed on a desk and a CD rom holder unit attached to the case in its place.

In FIGS. 1–3, a case 10 for a computer apparatus 12 in accordance with the present invention is shown. The computer case 10 normally houses the control circuitry for the computer 12. The computer apparatus 12 can be in the form of a personal computer which may include a keyboard 13 for inputting data, a monitor 14 and a mouse control 15 that rest on top 16 of desk 17 as is common in these types of computers. These and other peripherals are not a part of the present invention and can vary substantially from that depicted. In addition, the case 10 is shown in the form of a tower case that is designed to be oriented vertically; however, it will be recognized that the present invention is also capable of finding use in desk top cases which are for being laid horizontally on their side on a desk surface.

One important feature of the present invention is that the case 10 includes a modular detachable multiple drive unit 18 that is provided with a plurality of drive bays 20 (FIG. 4a) for receiving various devices including mass storage devices 23 such as, 3½ and 5¼ inch floppy disks, hard disk drives, CD roms, tape back-up units and the like. As shown, there is an upper bay 20a having a cover plate 21 placed thereover such that with the plate 21 removed, the top bay 20a is open and adapted to removably receive a removable drive unit (not shown), and a lower bay 20b that has a exemplary drive 22 attached therein. The number and type of bays can vary widely from that set forth above.

The modular drive unit 18 is detachable from the tower case 10, normally placed at a position on the ground around or under a desk 17 so that it does not obstruct or otherwise interfere with the space on the desk top 16. The drive unit 18 can be detached therefrom maintaining communication therewith via interface 24 that can include an external flexible cable 26 attached between the case 10 and detached drive unit 18, as will be described more fully hereinafter. In this manner, the drive unit 18 can be placed on a desk 20 to allow a user to have convenient access to the drives. Thus, the present case 10 including the detachable drive unit 18 thereof is a significant improvement over prior computer cases which require users to stop what they were doing and locate the case on the ground for inserting removable drives into bays and disks into the drives of the case.

Another feature of the invention is the provision of a movable or slidable door or cover member 28 mounted to the case 10. As is known, the case 10 can include drive bays 30 similar to that of the drive unit bays 20 for receiving drives 32 for example, for mass storage devices 23. Blank cover panels 31 can be mounted over the bay openings 30 where the users do not have drives 32 for being placed therein. The sliding door 28 is utilized and is adapted to be moved into a blocking position (FIG. 1) where the door 28 blocks access to the bays, and which can be lowered down to an accessing position (FIG. 2) for providing access to the bays 30 and drives 32. With the door 28 in the blocking position of FIG. 1, the bays 30 and drives 32 are hidden from view and the door 28 is designed so as to appear to be a stationary, non-movable part of the exterior of the casing 10, as will be more fully described hereinafter.

For removing or detaching the drive unit 18 from the case 10, a removable attachment or detachable connection 34 is provided. Another advantage provided by the door 28 is that when the door is in its upper blocking position, the attachment or connection 34 between the unit 18 and case 10 is not visible and similar to the drives 32 is inaccessible. In this manner, the drives are protected from dust.

Figures 4A, 4B, 5A, 5B, 5C:
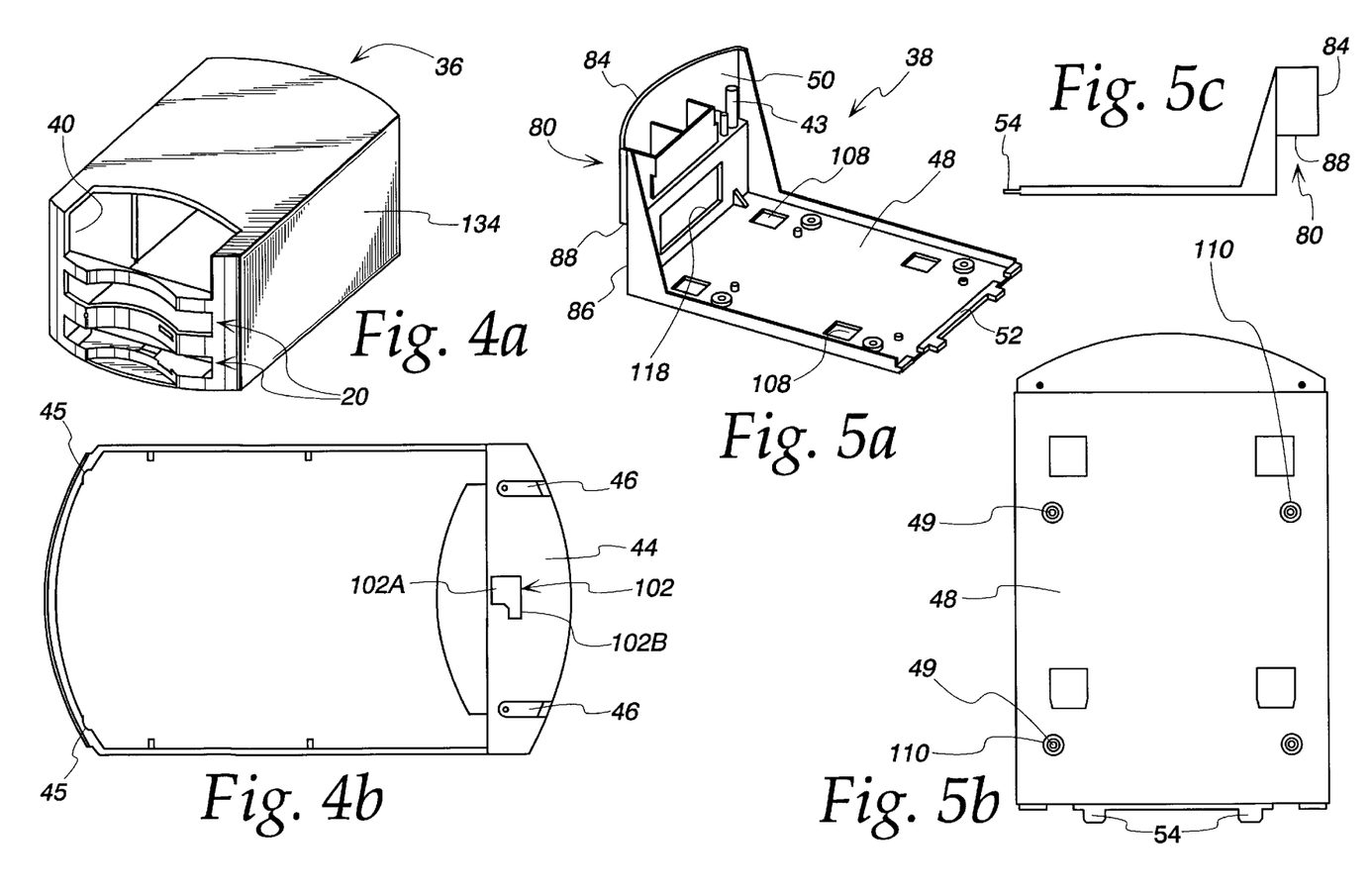

Turning now to a description of the preferred and illustrated form of the invention, the detachable multiple drive bay unit 18 includes an outer frame or bezel 36 defining the top, sides and front of the unit 18, and a base 38 which forms the bottom and back of the unit 18. The bay openings 20 are formed in the front of the bezel 36, as shown in FIG. 4a. In addition, an opening 40 is provided at the top of the front of the frame 36 and extending over the forward end of the top of the bezel 36 for receiving an LCD module 42.

The frame 36 includes small bottom wall portion 44 extending a short distance rearwardly from the bottom of the front of the frame 36, as best seen in FIG. 4b. The bottom wall 44 includes a pair of laterally spaced recessed slots 46 for receiving fastener members to attach to metal framing (not shown) for the drive 22 and circuitry inside the unit 18. The base 38 of the unit 18 includes a bottom wall member 48 having a back member 50 upstanding from the rear thereof. The bottom member 48 of the base 38 includes an offset transverse bar portion 52 formed at the forward edge thereof and which includes laterally spaced tabs 54 projecting therefrom. Four countersunk fastener receiving apertures 49 are spaced around the perimeter of the bottom member 48. For assembly, the tabs 54 are slid over the top of the rear edge of the bezel bottom wall portion 44 so that bottom surfaces of the walls 44 and 48 are flush to form bottom exterior surface 55 of the drive unit 18. In this position, the apertures 49 are aligned with apertures on the interior metal framing of the unit 18 for receiving fastener members therethrough thereby indirectly attaching the base 38 to the bezel 36 that is also fastened to the framing.

In addition, the base 38 includes a pair of fastener receiving bosses or posts 43 which project vertically upward from the inner surface of the shoulder 88 and which are aligned with interior threaded apertures 45 at the rear of the bezel member 36. Screw fasteners can be inserted into posts 43 and screwed into apertures 45 to form a direct connection between the bezel 36 and base 38 at the rear of the unit 18.

Figure 7A:
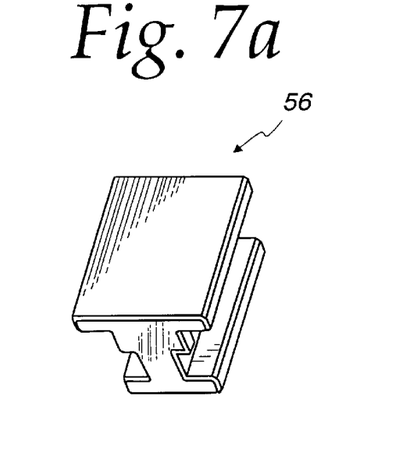
FIG. 7a is a perspective view of a latch operator of a latching mechanism for latching and unlatching of the removable m drive bay unit to and from the case.
Figure 7B:
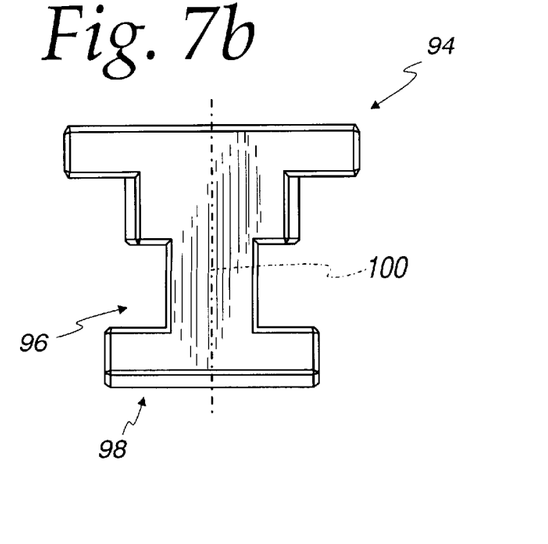

As previously mentioned, a removable attachment or connection 34 between the case 10 and the drive unit 18 thereof is provided for allowing the modular detachable drive unit 18 to be removed from the case 10. Preferably, the detachable connection 34 is in the form of a latching mechanism which includes a slide latch operator 56, as best seen in FIGS. 7a and 7b. Referring to FIG. 2 the case 10 includes exterior surfaces including side surfaces 58, front surface 60, rear surface 62, top surface 64, and bottom surface 66. The case 10 also includes mounting surfaces 70, shown in FIG. 2, which receive the drive unit 18 and which are normally hidden from view when the drive unit 18 is removably attached to the case 10 as in FIG. 1. Accordingly, when the drive unit 10 is removed from the case 10 via latching mechanism 34, the case 10 has a first outward or exterior predetermined configuration defined by its exterior surfaces 58, 60, 62, 64 and 66 along with exposed mounting surfaces 70 and including the exterior 28a of the sliding door 28 which can be either raised or lowered after the multiple drive bay unit 18 is detached. Preferably, once the unit 18 is removed from the case 10, the door 28 is raised to cover the case bays 30 and drive 32 for both precautionary reasons to limit access thereto and for aesthetic purposes.

When the drive unit 18 is attached to the case 10 as in FIG. 1, the back and bottom of the unit 18 sit on and cover the case mounting surfaces 70 to present a second exterior predetermined configuration that is different from the first configuration of FIG. 2. As is apparent by reference to FIGS. 1 and 2, when the unit 18 is detached, the first configuration of the case 10 exposing the mounting surfaces 70 makes it look as if the case 10 is an unfinished product with a piece missing, whereas when the drive unit 18 is attached, the case 10 presentation is very polished giving the case 10 an extremely appealing finished appearance with continuity between exterior surfaces of the case 10 and drive unit 18, as will be more fully described hereinafter.

Figures 8, 9:
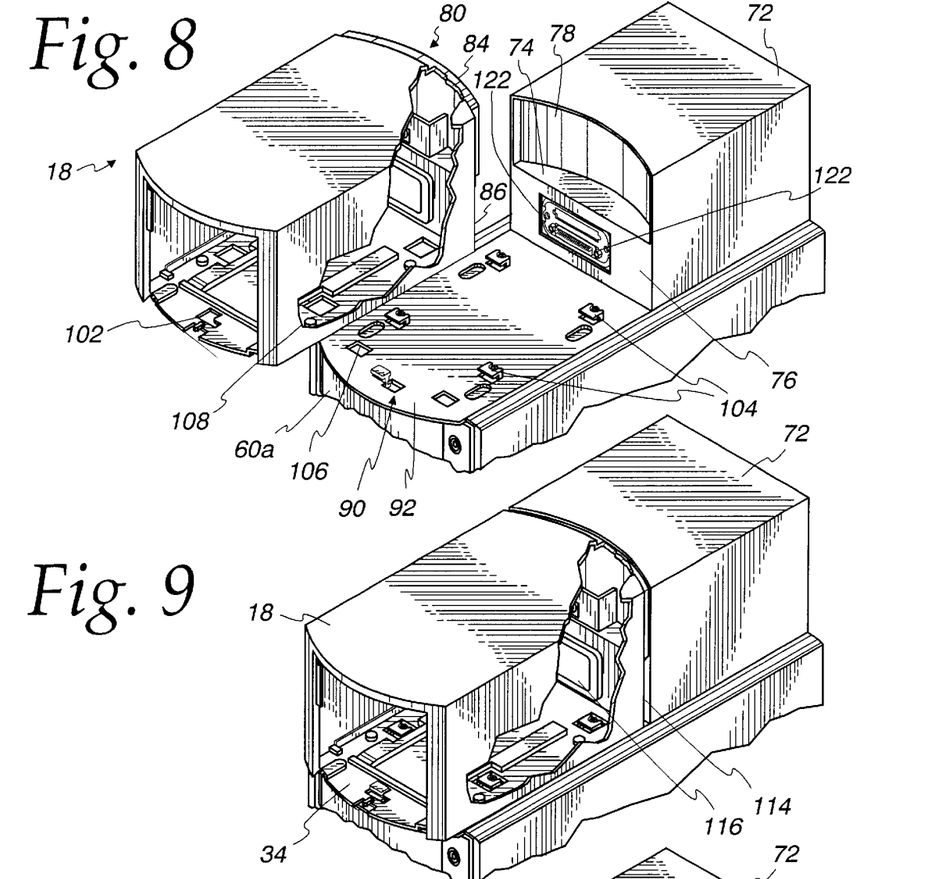
FIG. 8–10 are perspective views of the latching procedure for latching the removable modular drive bay unit to the case.

More specifically, the case 10 includes an upper generally box-shaped portion 72 at the top rear of the case 10 and having a forward portion thereof which defines the front generally vertical mounting surface 70, as best seen in FIGS. 2 and 8. The vertical mounting surface 70 of the upper box-shaped portion 72 has a stepped configuration including a small horizonal ledge or step 74 extending rearwardly from the top of a substantially flat vertical surface portion 76. The lower vertical surface 76 is offset out forwardly from an upper vertical arcuate surface 78 due to the provision of the step ledge 74. The upper arcuate surface 78 is provided with a concave curvature, as best seen in FIGS. 2 and 8.

Figure 6A:
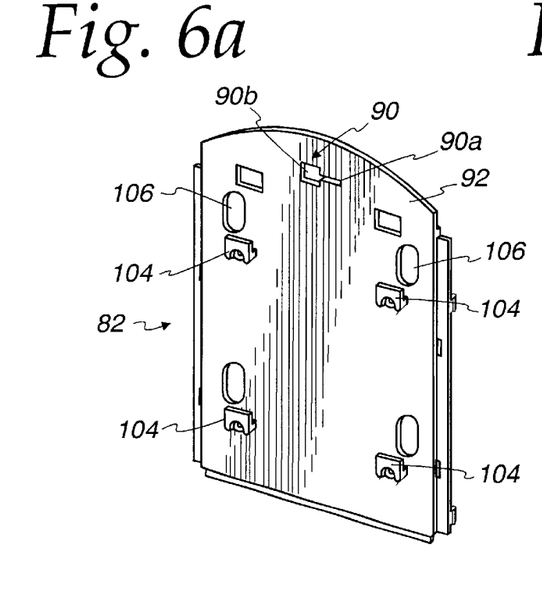
FIG. 6a is a perspective view of a cover member to which the modular drive bay unit is attached onto the case.
Figure 6B:
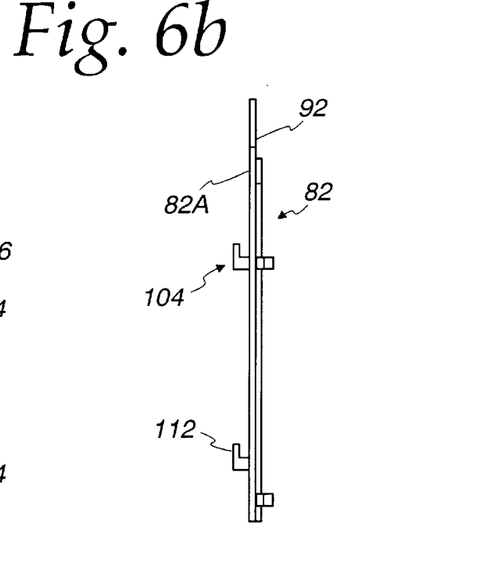
FIG. 6b is a side elevational view of the cover member of FIG. 6a showing retaining members for keeping the drive bay unit from being pulled up off from the case.

Extending forwardly from the bottom of the vertical surface portion 76 and perpendicular thereto is a plate-like cover member 82, illustrated in FIGS. 6a and 6b. The top 82a of the cover member 82 forms the horizontal mounting surface 70 of the case 10 for the removable drive unit 18. The bottom wall of the drive unit 18 is releasably secured to the cover member 82 with the exterior surface 55 of the bottom of the drive unit 18 engaged with the top upper surface 70 of the cover member 82. In addition, the rear upstanding exterior surface 80 of the drive unit 18 has a stepped configuration that substantially matches the stepped configuration of the forward portion of the upper box 72 of the case 10.

Accordingly, the configurations of the mounting surfaces 70 of the case 10 and a section of the exterior surfaces of the drive unit 18, specifically the exterior bottom and rear surfaces 55 and 80 thereof are both generally L-shaped in profile to provide a close fit therebetween. More particularly, the rear surface 80 includes an upper arcuate portion 84 having a convex curvature substantially the same as the curvature of the arcuate surface 78 of the upper case portion 72. The rear convex portion 84 of the drive unit 18 is offset from a lower vertical portion 86 via shoulder 88 formed therebetween. Thus, with the drive unit 18 latched onto the casing 10 and the bottom surface 55 of the drive unit 18 in engagement with the horizontal mounting surface 70, the rear surface 80 of the drive unit 18 will be tightly engaged with the vertical mounting surface 70 with the convex surface 84 against the concave surface 78 and the vertical surfaces 76 and 86 abutting each other with the shoulder 88 resting on the ledge surface 74. In this manner, the bottom and rear exterior surfaces 55 and 80 of the drive unit 18 sit on and cover the mounting surfaces 70 of the case 10 when the unit 18 is latched thereon.

As previously mentioned, the detachable connection is preferably a latching mechanism 34 for keeping the drive unit 18 secured to the case 10. The slide operator 56 of the latching mechanism 34 is disposed in a T-slot 90 at the forward curved end portion 92 of the case cover member 82. This curved end portion 92 overhangs an upper flat vertical section 60a of the case front surface 60 in which the case bays 30 are provided. It should be noted that this front surface section 60a is normally to be covered by door 28 and accordingly will not usually be exposed for view for improved aesthetics with the case in either its first or second configurations.

The slot 90 includes a narrow elongate portion 90a corresponding to the stem of the T-slot 90 that opens centrally to a wider opening 90b corresponding to the transverse top of the T-slot 90. The latch operator 56 has a generally I-shaped cross-sectional configuration with a slightly modified top flange member 94 as described below. A central web 96 depends from the top flange 94 and a transverse bottom flange 98 is formed at the lower end thereof. The top flange 94 has an enlarged portion 100 immediately therebelow at the upper end of the central web 96, as best seen FIG. 7b. The distance between the bottom of the enlarged portion 100 and the top of the bottom flange 98 substantially corresponds to or is slightly greater than the thickness of the cover member 82. In this manner, the edges of the cover member T-slot 90 fit between the enlarged portion 100 and base flange 98 of the slide operator 56 with top flange 94 spaced above the upper horizontal surface 70 of the cover member 82 and the bottom flange 98 projecting below the overhanging curved end portion 92 of the cover member 82 for being accessed by a user with the door 28 slid down, as will be more fully described hereinafter.

The short bottom wall portion 44 of the bezel 36 includes a slot opening 102 between the recessed slots 46, as best seen in FIG. 4b. The slot opening 102 includes a large square portion 102a with a small foot portion 102b of the slot 102 extending from a forward corner of the square opening 102a.

The larger square opening 102a is to be aligned over the narrow portion 90a of the cover member T-slot 90 while the leg section 102b is to be aligned over the larger section 90b of the cover member slot 90.

The cover member 82 also includes four retaining members 104 connected or fastened thereto. The retaining members 104 are situated so that a pair of retaining members 104 are spaced longitudinally from each other and across from corresponding members 104 in the other pair along each side of the cover member 82, as best seen in FIG. 6a. Each retaining member 104 has an adjacent guide opening 106 which have a generally oval shape. The bottom member 48 of the drive unit base 38 includes retaining member receiving apertures 108 and adjacent guide pads 110 adhered over the apertures 49 with fasteners already secured therein and which are positioned around the bottom member 48 in a substantially matching arrangement to that of the retaining members 104 and oval openings 106 on the cover member 82. Referring to FIG. 6b, the retaining members extend up from the upper horizontal surface 70 of the cover member 82 and include lip portions 112 that project over and parallel to the upper surface 70. The distance between the bottom of the lip portion 112 and the surface 82a is approximately the same or slightly greater than the thickness of the bottom member 48 of the drive unit base 38.

Figure 10:
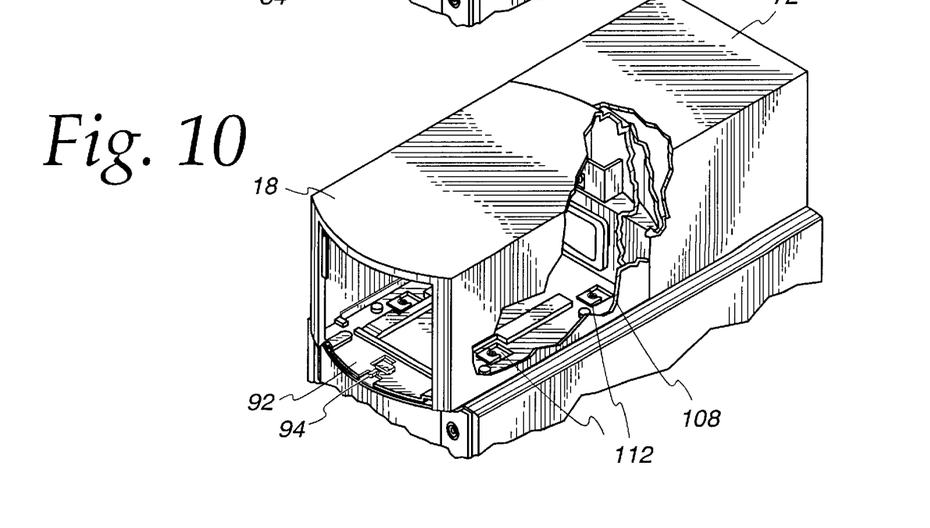

Referring now to FIGS. 8–10 for describing the latching procedure utilizing the latching mechanism 34 herein, the detached drive unit 18 is first brought to the case 10 with the mounting surfaces 70 exposed for view and the case 10 in its first exterior predetermined configuration (FIG. 2) where the door 28 has been lowered to expose the front section 60a and latch operator 56. The slide operator 56 is positioned in the elongate slot section 90a of the cover member 82 with the bottom of the top flange 94 thereof spaced above the cover member horizontal surface 70 by a distance corresponding to the thickness of the enlarged portion 100 which is approximately the same or slightly greater than the thickness of the bottom wall of the drive unit 18.

The drive unit 18 is then moved over the cover member 82 so that the large section 102a of the slot 102 is aligned over the top flange 94 of the slide operator 56, and the apertures 108 and the guides 110 of the base unit 18 are aligned with the retaining members 104 and guide openings 106, respectively. In this manner, the drive unit 18 can be lowered down on to the cover member 82 with the slide operator top flange 94 fitting through the slot section 102a. In addition, the retaining members 104 will fit through the apertures 108 with the forward end of the lips 112 clearing the front edge of the apertures 108, and the guides 110 projecting into the guide openings 106 towards the front thereof. In this position, the rear surface 80 of the drive unit 18 will be slightly spaced from the forward vertical front mounting surface 70 of the case portion 72 as by small spacing 114 as shown in FIG. 9.

Once the drive unit 18 is in position on the case 10 as shown in FIG. 9, the drive unit 18 can be pushed back towards the vertical mounting surface 70 with the guide pads 110 sliding from the front to the rear of the guide openings 106 and the lip portions 112 of the retaining members 104 projecting over the forward edges of the associated apertures 108 in the drive unit 18. In addition, the web 96 of the latch operator 56 will be moved into alignment with the foot 102b of the drive unit slide opening 102 so that the latch operator 56 can be slid by an operator pushing on the bottom flange 98 thereof exposed underneath the overhanging curved end 92 of the cover member 82 into the wide opening 90b of the cover member T-slot 90. In this regard, it should be noted that the door 28, if it has not already been lowered, must be slid down somewhat to allow access to underneath the overhanging curved end portion 92 of the cover member 82 for sliding of the latch operator 56. In this latched position depicted in FIG. 10, the top flange 94 of the latch slide operator 56 is engaged over the edges of the cover member 82 around the foot 102b of the slot 102, and the lips 112 of the retaining members 104 are engaged over the forward edges of the cover member 82 along the apertures 108 to prevent the drive unit 18 from being lifted upwardly off the case 10. In addition, as the latch operator web 96 is tightly received in the foot portion 102b of the drive unit slot 102 any forward movement of the drive unit 18 off from the case 10 is prevented.

Figure 19:
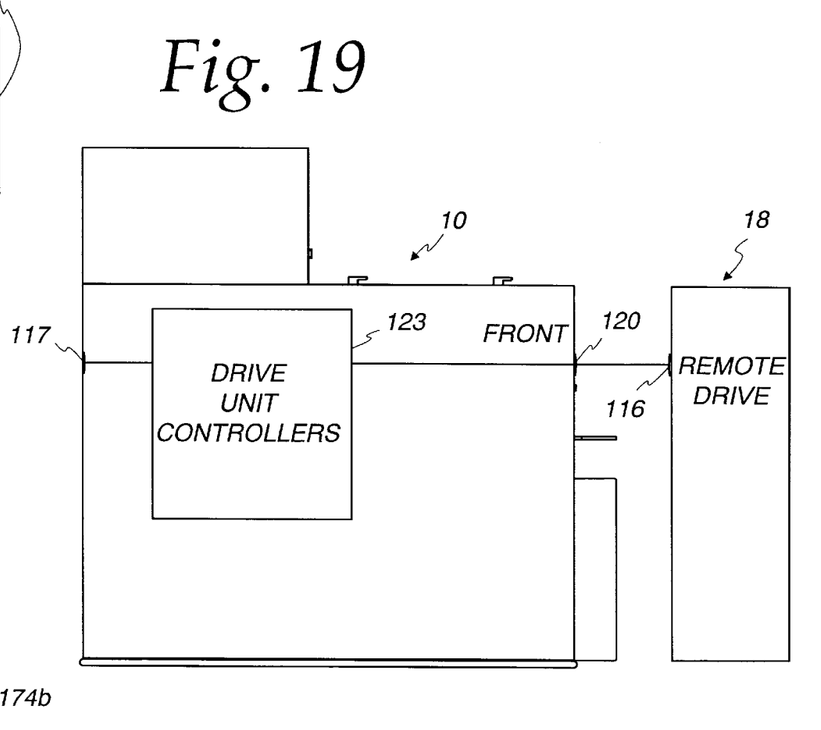
FIG. 19 is an electrical block diagram for the system in accordance with the present invention.

The drive unit 18 includes single electrical connector 116, such as a 68-Pin SCSI III Connector mounted to project through connector opening 118 formed in the vertical wall 86 at the rear of the drive unit 18 with the connector 116 serving to electrically connect the drive bays 20 and the LCD module 42 to the control circuitry in the case 10. A mating electrical connector 120 is mounted in connector opening 122 formed in the vertical mounting surface 70 of the case, and more particularly on the vertical surface 76 of the case portion 72 defining a front connector 120, as depicted in FIG. 19. An identical connector 117 is located in the rear of the tower unit 10. The connectors 117 and 120 are connected to conventional drive unit controllers 123. Thus, when the drive unit 18 is pushed back so that the drive unit rear 80 tightly engages the vertical mounting surface 70 to eliminate the spacing 114 therebetween, the mating connectors 116 and 120 are in alignment and will be electrically connected so that the drive unit 18 can be controlled by the circuitry in the case 10. As is apparent, the use of a single connector 116 simplifies the attachment and electrical coupling of the modular multiple drive bay unit 18 to the case 10.

To remove the drive unit 18, the above steps are reversed. Accordingly, first the door 28 is slid down along the front 60 of the case 10 to provide access to the bottom flange 98 of the latch operator 56. Thereafter, the latch operator 56 is slid laterally to move the web 96 back into the narrow section 90a of the cover member slot 90 and into the large square portion 102a of the drive unit slot opening 102. The drive unit 18 is then pulled forwardly to unplug the connectors 116 and 120 until the rear edges of the apertures 108 hit the retaining members 104 with the guides 110 moved towards the rear of the guide openings 106.

In this position, the drive unit 18 can be lifted off the case 110 as the forward ends of the retaining member lips 112 will clear the forward edges of the drive unit apertures 108 and the latch operator top flange 94 will fit through the enlarged portion 102a of the drive unit slot opening 102. With the drive unit 18 separated from the case, the interface 24 between the unit 18 and case 10 can be established by external cable 26 attached to the connector 116 at the rear of the drive unit 18 and to rear connector 117 at the back 62 of the casing that is identical to the connector 120 provided at the front of the upper case portion 72. In this manner, the drive unit 18 can be placed on a desk top 16 as shown in FIG. 3 with the remainder of the case 10 underneath the desk 17 to conserve space on the desk top 16 while still providing easy access to the bay 20a and floppy drive 22. In addition, the LCD module 42 can include a display 42a which now can be readily viewed to provide a wide variety of information to the user such as time and date readouts and information regarding the internal functioning of the computer circuitry.

As discussed earlier, the case 10 in its second configuration with the drive unit 18 attached thereto has a very polished and refined appearance over the substantially rectangular box shaped cases utilized in prior personal computers. In this regard, the case 10 has a small upper head section 124 and a larger lower body section or chassis 126 with the upper head section 124 including the top rear portion 72 and the modular drive unit 18 of the case 10. The lower body portion 126 includes the door 28, front upper surface section 60a, lower arcuate grill member 128 (FIGS. 12a–12c) at the lower front section 60b of the casing, and metallic side plates 130. The lower grill member 128 and the lower sections of the side plates 130 include apertures 132 therein with apertures 132 on the side plates 130 extending through the plates 130 to allow air flow into and out of the case 10 drawn therethrough by a fan (not shown) mounted in the case 10 while the apertures 132 in the front grill member 128 are primarily for aesthetic purposes as they do not extend through the grill member 128 and are provided mainly to provide continuity in terms of appearances with the side plates 130.

When the drive unit 18 is attached to the case 10, the exposed exterior surfaces of the unit, that is side surfaces 134, top surface 136 and front surface 138 are designed to conform to and complement the remainder of the case 10 as follows. Both the side surfaces 134 and top surface 136 are substantially flush with corresponding top surface 140 and side surfaces 142 of the upper case portion 72 so that the case head section 124 has a smooth finished appearance with the drive unit 18 attached thereto. In addition, the front surface 138 of the drive unit 18 has a generally convexly curved configuration so that it blends in with the remainder of the front 60 of the case 10. The door 28 similarly is of an arcuate shape so that it is bowed away from the front 60 of the case 10 as is the grill member 128. In particular, the curvature of the drive unit front surface 138 substantially conforms to that of the sliding door 28 and the curvature of the door 28, in turn, substantially conforms to that of the lower grill member 128 keeping in mind that the grill member 128 has a radius of curvature that is somewhat less than the radius of curvature of the door member 28 to allow the door 28 to slide thereover when the door 28 is lowered to its accessing position, as shown in FIGS. 2 and 14.

In addition, with the unit 18 attached, the forward portion of the unit 18 will rest on the curved end portion 92 of the cover member 82 that is overhanging relative to the vertical upper surface section 60a of the case 10 with the front portion of the unit 18 being slightly offset forwardly from the cover member end portion 92 for a purpose discussed hereinafter. In this regard, the grill member 128 also projects forwardly relative to the upper surface section 60a and is generally vertically aligned with the drive unit front surface 138. While the door member 28 is slightly offset forwardly from the grill member 128 to accommodate sliding movement thereover, the door 28, grill member 128 and drive unit front surface 138 are substantially complementary in appearance to present a uniform appearance to the front curved surface 60 of the case 10, including the front 138 of the modular drive unit 18, the front 28a of the door 28, and the front 128a of the grill 128, when the door 28 is moved up to its blocking position of FIGS. 1 and 13 in which position the door 28 can be maintained for the majority of time except when the bays 30 and drive 32 of the case 10 need to be accessed or when the drive unit 18 is to be detached or attached to the case 10, as previously discussed. In addition, it can be seen that the side surfaces 134 and 142 of the drive unit 18 and case upper portion 72 are slightly offset laterally inwardly from the exterior surfaces of the side plates 130 so that the head section 124 has a narrower appearance than the body section 126 of the case 10 herein contributing to the non-box like attractive appearance of the present case 10 distinguishing it from the standard desk top and other rectangular box cases.

Referring to Figs. 11a–c and FIGS. 13–15, the door member 28 is mounted to elongated guide tracks 144 provided on either side of the front 60 of the casing with a central portion 145 of the door 28 bowed outwardly so that it is spaced forwardly of the case 10. The door 28 has lateral edges 146 with each edge having an associated pair of longitudinally spaced slide members 148 adjacent thereto. The slide members 148 have a pair of spaced legs 150 extending rearwardly from the back surface 28b of the door 28 which faces the casing front 60 at all times as it is slid up and down therealong by way of the guide tracks 144 and slide members 148. At the distal ends of the legs 150 there is provided a bearing member 152 having slightly raised nubs 154 which engage the guide tracks 144 for sliding therealong. The spacing of the parallel guide tracks 144 and the slide members 148 on opposite side edges 146 of the door 28 is such that when the slide members 148 are received in their tracks 144, they will be slightly biased or preloaded into engagement therewith. In this regard, the door member 28 can be made of a resilient material such as an ABS plastic although it will be recognized that other materials including thin metal doors could be utilized for this purpose.

Figures 13, 14, 15:
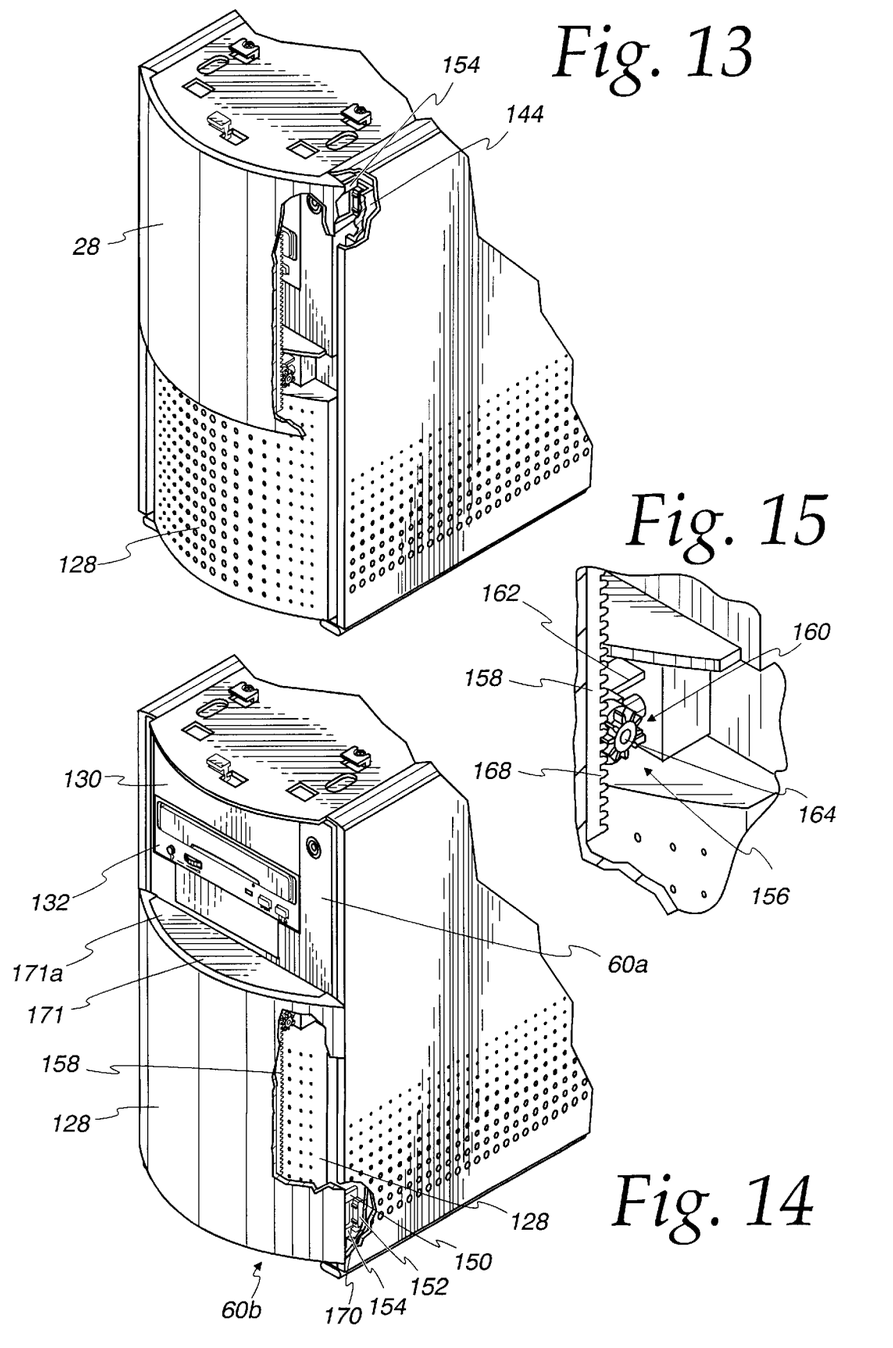
FIG. 13 is a perspective view of the door in its raised position with the grill member exposed thereunder with a portion of the case broken away to show a slide member of the door in a guide track of the case for sliding of the door.
FIG. 14 is a perspective view similar to FIG. 13 with the door lowered over the grill member exposing the case bays and drive.
FIG. 15 is an enlarged fragmentary perspective view of gear drive arrangement to provide the door with smooth sliding action between its raised and lowered positions.

The preloading of the slide members 148 in guide tracks 144 insures that the door 28 will have sufficient frictional resistance to sliding along the track 144 so that the door 28 will stay in position when released such as in the raised locking position of FIG. 1 and 15. In this highestmost position, the frictional resistance provided by the preload of the door 28 will not be overcome by the relatively light weight of the door 28 so that the door 28 does not fall under the influence of its own weight from the raised blocking position.

Figures 11A, 11B, 11C, 12A, 12B:
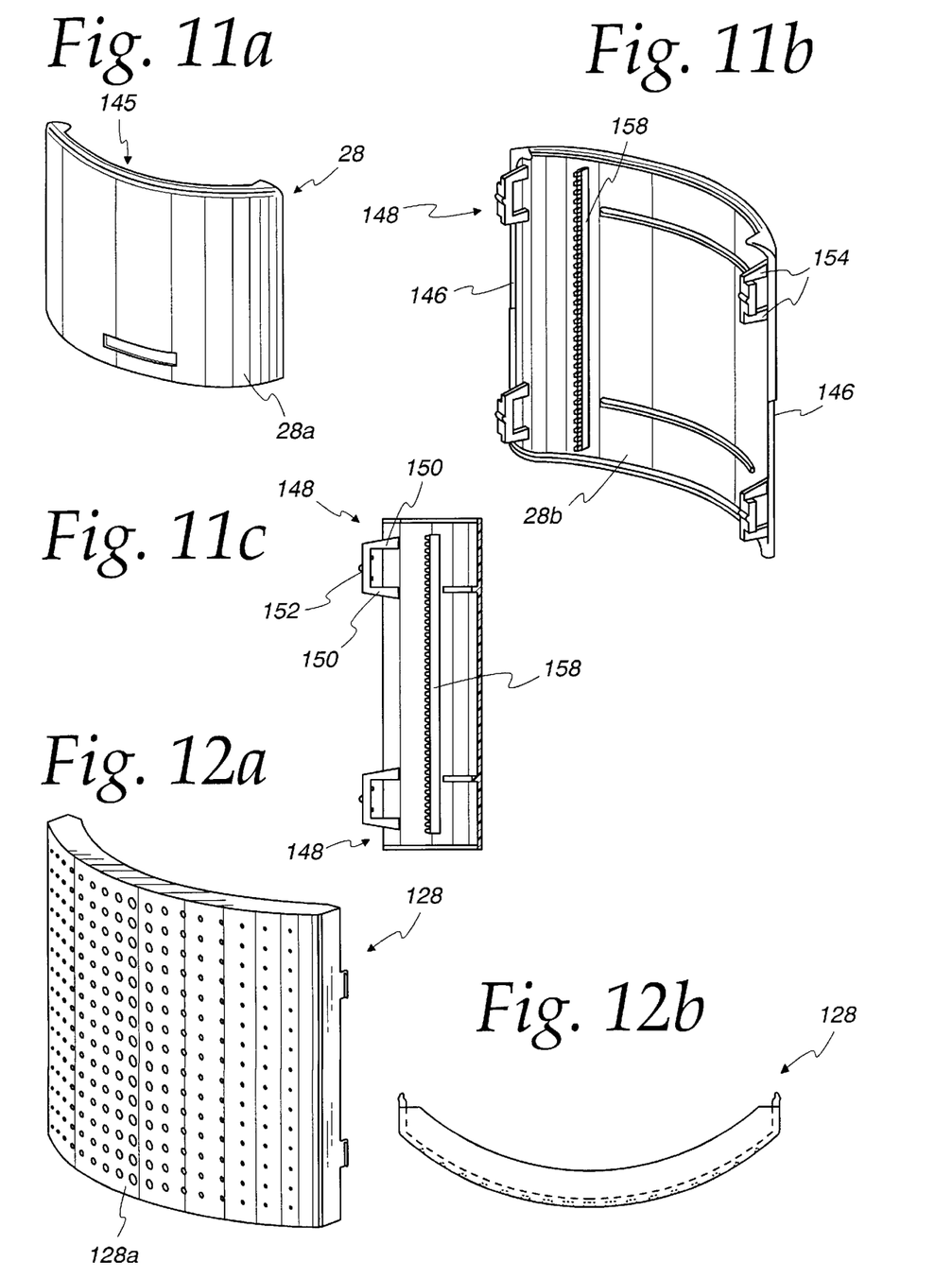

To provide the door with a smooth sliding action without any hang-ups along the guide tracks 144, a gear drive generally designated 156 is provided between the case 10 and door 28. More specifically, the door 28 has a toothed longitudinally extending member 158 formed on the rear surface 28b thereof and closer to one of the lateral edges 146 of the door 28 than the other, as can be seen in FIGS. 11b and 14. The member 158 extends substantially the entire length of the door 28. A gear wheel assembly 160 is attached to the case 10 just above the grill member 128, as best seen in FIG. 15. The gear wheel assembly 160 includes a mount 162 which has a shaft 164 carrying gear wheel 166 journaled therein as by bearings. With the door slide members 148 attached in the guide tracks 144, the gear wheel 166 will mesh with teeth 168 of the longitudinal rack member 158 to provide the door with a geared arrangement for smooth driving of the door 28 as the slide members 148 are moved in the guide tracks 144. As the door 28 is made to be manually actuated or pushed, the gear drive 156 provides a mechanical advantage so that the door 28 slides in a smooth manner overcoming frictional resistance generated by the preloading of the slide members door 28 in the guide tracks 144. Thus, the door 28 can be readily moved so that it slides in the guide tracks 144 between its uppermost raised position where the top of the door 28 abuts the front portion of the drive unit 18 that extends past the front curved end 92 of the cover member 82 and down to its lowermost position where the guide members 148 engage stops 170 provided at the lower ends of respective guide tracks 144.

An additional advantage of the sliding door 28 arises due to the provision of a curved horizontal wall portion 171 of the case 10. The wall portion 171 is spaced above the top of the grill member 128 and extends out forwardly from near the bottom of flat vertical section 60a of the casing 10 to an outboard arcuate edge 171a having a curvature substantially the same as the grill 128 so that the wall 171 along with the curved end portion 92 of the cover member 82 block off the bottom and top access formed between the curved door 28 and flat surface section 60a when the door 28 is in the raised blocking position. In this manner, raising the door 28 to its blocking position substantially seals off the bays 30 and drives 32 of the case 10 from any type of access that may be had around behind the bowed out central portion 145 of the door 28.

Figure 16:
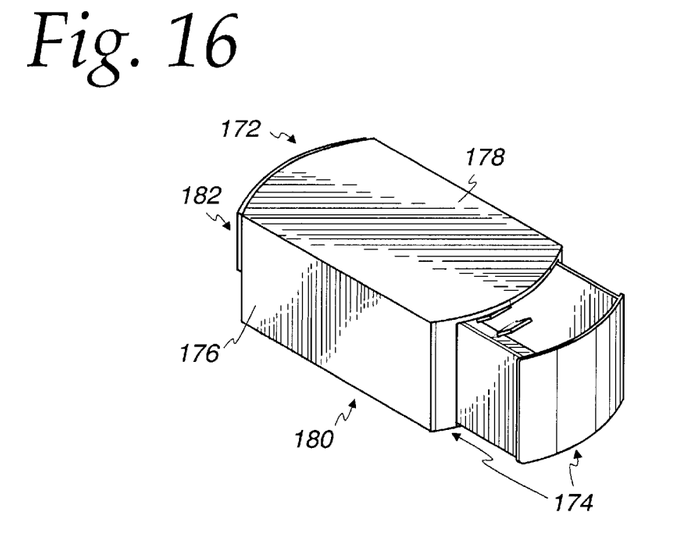
FIG. 16 is a perspective view of a holder unit for CD roms including an outer housing portion and a inner box tray slidably mounted thereto.

As previously discussed, when the case 10 was in its first predetermined configuration with the removable multiple drive bay unit 18 detached therefrom, the case 10 takes on an unfinished appearance because of the exposed mounting surfaces 70 due to the absence of the drive unit 18 thereon. Accordingly, rather than leaving the case 10 in this rather unattractive configuration, the present invention also provides a holder unit 172 for being removably attached to the case 10 when the drive 18 has been detached therefrom and is electrically connected thereto by the cable 26. The holding unit 172 shown in FIGS. 3 and 16 is adapted to hold a plurality of mass storage devices 23 such as CD roms therein.

The holding unit 172 has an exterior appearance substantially similar to that of the drive unit 18 less the LCD module 42 and bays 20 and drives 22 thereof. In this regard, the holder unit 172 when closed has a curved front surface 174, side surfaces 176, top surface 178, bottom surface 180, and a rear stepped surface 182. In contrast to the drive bay unit 18 which has a front curved surface 138 that is interrupted by the drive 22 including associated projecting eject button 210, sleep button 212, and projecting button 214 associated with drive bay 20b, the holding unit front curved surface 174 is smooth and substantially uninterrupted such as by projecting buttons and the like. Accordingly, the predetermined configuration afforded by attaching the holder unit 172 to the case 10 while being very similar to that provided by the attached drive unit 18 is also somewhat improved due to the more continuous nature of its front curved surface 174 for better blending with the curved door 28 and grill member 128.

The exterior surfaces include a section thereof, specifically the flat horizontal bottom surface 180 and upstanding stepped rear surface 182 therefrom, that have a substantially matching configuration to that of the case mounting surfaces 70 for being seated thereon. The holder unit includes an outer housing portion 184 which defines the surfaces 176, 178, 180, and 182 and side portions 174a of the front surface 174. The side portions 174a bound an opening 194 leading to interior 196 of the housing 184. The housing 184 can be of a two-part construction similar to the bezel 36 and base 38 of the drive member 18. Also, similar to the apertures 108 and guides 110 of the drive unit 18, the bottom wall 186 of the housing includes apertures 188 and guides 190 arranged in an identical pattern. Parallel guide rails 193 extend along the length of the bottom wall 186 in the housing interior 196. In addition, front curved end portion 192 of the housing bottom wall includes a slot opening 194 that is configured the same as the drive unit slot opening 102 for cooperating with the latch operator 56, as previously described with respect to the drive unit 18.

Figure 18A:
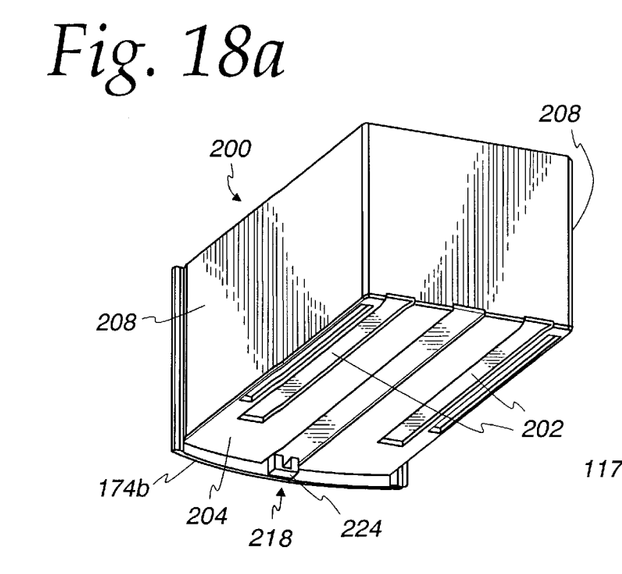
FIG. 18a is a perspective view of the box tray of the holder unit showing the elongate slots in which the rails are received and a portion of a detent mechanism for releasably keying the tray closed in the housing and allowing it to be pulled out therefrom.
Figure 18B:
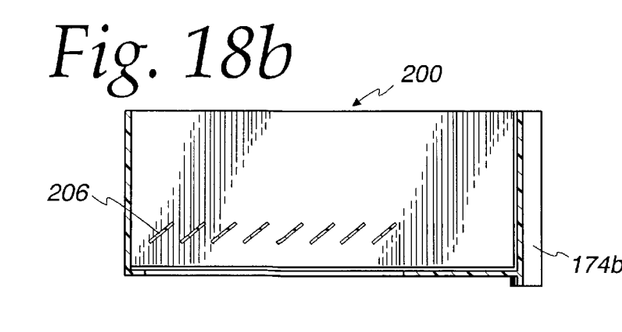
FIG. 18b is a side sectional view of the box tray and showing inner inclined CD support projections for supporting the CDs in the box tray.

A CD box tray 200 is shown in FIGS. 18a and 18b for being inserted in the housing interior 196. The box tray 200 can slide on the guide rails 193 by way of parallel elongate recessed slots 202 formed in the bottom surface 204 of the box tray 200. The box tray 200 has a plurality of inner inclined CD support projections 206, as best seen in FIG. 18b. The projections 206 extend inwardly from the interior of parallel side walls 208 of the box tray. The side walls 208 are spaced so that they are wider than the width of a standard CD rom case 23 with the distance between the interior edges of opposite projections 206 being less than the width of the CD rom case 23 so that the CD rom case 23 can be supported by opposite projections 206 in an inclined manner. The box tray has a front curved portion 174b which has a radius of curvature substantially matching that of the side portion 174a of the housing 184 and is sized to snugly fit therebetween so that when the box tray 200 is closed with the CDs 23 carried into the housing interior 196, the box tray front curved portion 174b cooperates with the housing curved side portions 174a to present a smooth and uniformly curved front surface 174 for the holder unit 172.

Figure 17A:
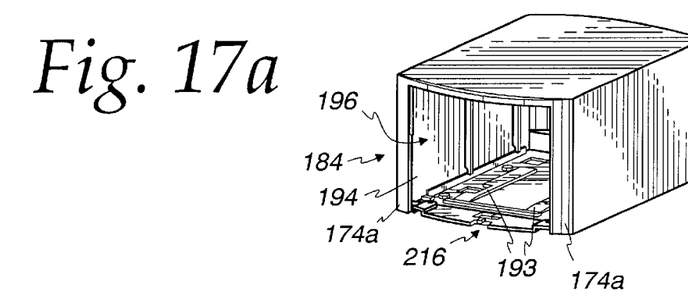
FIG. 17a is a perspective view of an outer housing portion of the holder unit showing interior rails on which the box tray slides.
Figure 17B:
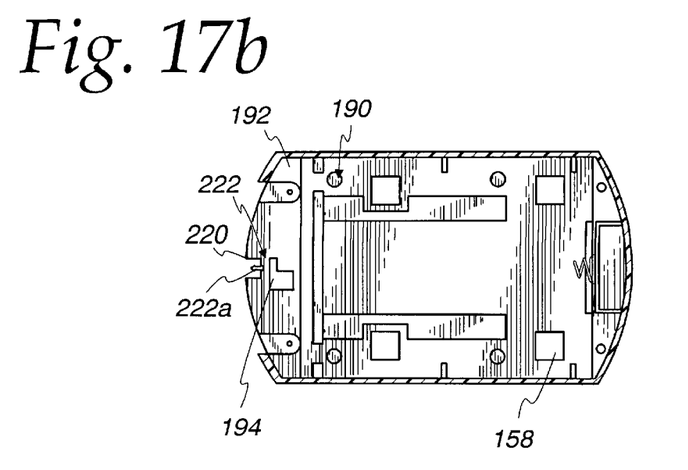
FIG. 17b is a bottom plan view of the holder unit housing showing the slot and openings for latching the holder unit to the case.

For releasably locking the tray 200 in its closed position in the housing 184, both the housing 184 and the tray 200 include respective portions 216 and 218 of a detent mechanism. The detent mechanism portion 216 of the housing 184 is in an open ended slot 220 formed in the front curved end wall portion 192 of the housing 184. A small short projections 222 extends forwardly from the rear edge of the slot opening 220 stopping short of the curved outboard edge of the curved end wall portion 192, as best seen in FIG. 17b. The detent mechanism 216 of the box tray 200 includes a pair of spring loaded grabber arms 224 which project rearwardly from adjacent the bottom of the front curved portion 174b and below the bottom surface 204 of the tray.

Accordingly, sliding the tray 200 into the interior 196 of the housing 184 causes the projection 222 to push the arms 224 against their spring bias until they snap back towards each other into holding engagement about an enlarged distal head portion 222a of the projection 222. To release the grabber arms from about the head 222a of the projection 222, the front curved portion 174b of the box tray 200 is pushed slightly further inwardly relative to the housing 184 to allow the grabber arms 224 to open back up with the spring bias then taking effect to push the tray 200 slightly forwardly from the housing 196. This allows the front curved portion 174b to be grasped for sliding the box tray 200 out for accessing the CD roms 23 therein, as shown in FIGS. 3 and 16.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. An apparatus for performing computer operations, the apparatus comprising:

a case having an elongate shape and being adapted to be placed on end as a vertical tower type of case, the case including at least one bay;

a drive of mass storage devices for being received in the bay;

a door mounted to the case and being shiftable between a first position with the door blocking access to the drive in the bay to prevent insertion of mass storage devices into and removal of mass storage devices from the drive and a second position with the drive being accessible for allowing the insertion of mass storage devices into and removal of mass storage devices from the drive; and a slide connection between the door and the case including a pair of vertical guide tracks on opposite sides of the case and slide members on opposite sides of the door for engaging in the guide tracks with the spacing of the guide tracks relative to the spacing of the slide members being such that the slide members are preloaded into engagement with the guide tracks which allows the door to be manually slid between the first and second positions and released at various locations relative to the case with the door staying thereat due to the preload of the slide members against the guide tracks.

2. The apparatus of claim 1 wherein the door has a substantially central portion thereof between the door edges which is spaced outwardly from the case.

3. The apparatus of claim 2 wherein the door has an arcuate shape so that it bows out away from the case.

4. An apparatus for performing computer operations, the apparatus comprising:

a case having at least one bay;

a drive of mass storage devices for being received in the bay; and a door mounted to the case and being shiftable between a first position with the door blocking access to the drive in the bay to prevent insertion of mass storage devices into and removal of mass storage devices from the drive and a second position with the drive being accessible for allowing the insertion of mass storage devices into and removal of mass storage devices from the drive, wherein the case has an elongate shape and is adapted to be placed on end as a vertical tower type of case, and the case includes track guides to which the door is mounted for sliding movement along the length of the case between the first and second positions, and the vertical tower case has upper and lower portions with the bay being at the upper portion of the case and with the door in the first position the door is at the upper portion of the case and in the second position the door is at the lower portion of the case, and the door includes lateral edges having slide members that are preloaded in the track guides such that with the door slid to the upper bay blocking position the door preload keeps the door stationary preventing the door from sliding back down along the guides to the lower bay accessing position, and a manually actuated drive between the case and the door for allowing a user to move the door between its respective positions in a smooth manner overcoming frictional resistance generated by the preloading of the door.

5. An apparatus for performing computer operations, the apparatus comprising:

a case having at least one bay;

a drive of mass storage devices for being received in the bay; and a door mounted to the case and being shiftable between a first position with the door blocking access to the drive in the bay to prevent insertion of mass storage devices into and removal of mass storage devices from the drive and a second position with the drive being accessible for allowing the insertion of mass storage devices into and removal of mass storage devices from the drive;

a gear drive between the case and door for moving the door between the first and second positions;

wherein the door includes lateral edges having slide members that are preloaded in track guides, mounted on the case, such that with the door slid to the first position the door preload keeps the door stationary preventing the door from sliding along the guides to the second position.

6. The apparatus of claim 5 wherein the gear drive includes a gear wheel and a rack for cooperating with the gear wheel for moving of the door between the first and second position.

7. An apparatus for performing computer operations, the apparatus comprising:

a case having at least one bay;

a drive of mass storage devices for being received in the bay; and a door mounted to the case and being shiftable between a first position with the door blocking access to the drive in the bay to prevent insertion of mass storage devices into and removal of mass storage devices from the drive and a second position with the drive being accessible for allowing the insertion of mass storage devices into and removal of mass storage devices from the drive;

a modular drive unit for being removably attached to the case, a latching mechanism between the case and modular drive unit for latching and unlatching the modular drive unit to and from the case, wherein the latching mechanism is only accessible for unlatching and removing the modular drive unit from the case when the door is in one of the first and second positions; and wherein the door includes lateral edges having slide members that are preloaded in track guides, mounted on the case, such that with the door slid to the first position the door preload keeps the door stationary preventing the door from sliding along the guides to the second position.

8. The apparatus of claim 7 wherein the latching mechanism is accessible with the door in the second position.

9. An apparatus having circuitry for performing computer operations, the apparatus comprising:

an elongate housing having a front and back and spaced ends;

at least one bay with an opening at the front of the housing;

a drive for a mass storage device for being received in the at least one bay for insertion of the device into the drive and into electrical communication with the circuitry;

a door having a front and back and being mounted to the housing with the back of the door facing the front of the housing and including a blocking position relative to the drive and an accessing position relative to the drive;

a slide connection between the door and the housing for free vertical sliding of the door between the blocking position preventing access to the drive and the accessing position to allow access to the drive with the force required for vertical sliding of the door either vertically upward or vertically downward being substantially the same, the fronts of the housing and the door facing the same general direction with the door in either the blocking or accessing position with the front of the door being exposed for viewing at all locations between the blocking and accessing positions; and wherein the door includes lateral edges having slide members that are preloaded in track guides, mounted on the housing, such that with the door slid to one of the positions the door preload keeps the door stationary preventing the door from sliding along the guides to the other position.

10. The apparatus of claim 9 wherein the back of the door is generally spaced from the front of the housing as the door is slid between the blocking and accessing positions.

11. The apparatus of claim 9 wherein the front of the housing includes an arcuate portion adjacent one its ends and the door has an arcuate shape for sliding over the housing arcuate portion and being generally complementary to the housing arcuate portion such that with the door slid towards the other end of the housing, the door provides the front of the housing with an arcuate appearance.

12. An apparatus having circuitry for performing computer operations, the apparatus comprising:

an elongate housing having a front and back and spaced ends;

at least one bay with an opening at the front of the housing for receiving a drive for a mass storage device in the housing for insertion of the device into the drive and into electrical communication with the circuitry;

a door having a front and back and being mounted to the housing with the back of the door facing the front of the housing; and a slide connection between the door and the housing for sliding of the door between a blocking position preventing access to the drive and an accessing position to allow access to the drive, the fronts of the housing and the door facing in the same general direction with the door in either the blocking or accessing position, wherein the housing has one of its ends adapted to be placed on a support surface during computer operations with the bay being adjacent the other end of the housing, and wherein the door includes lateral edges having slide members that are preloaded in track guides, mounted on the housing, such that with the door slid to one of the positions the door preload keeps the door stationary preventing the door from sliding along the guides to the other position, and a gear drive between the door and housing to provide smooth sliding of the door.

13. An apparatus having circuitry for performing computer operations, the apparatus comprising:

an elongate housing having a front and back and spaced ends;

at least one bay opening at the front of the housing for receiving a drive for a mass storage device in the housing for insertion of the device into the drive and into electrical communication with the circuitry;

a door having a front and back and being mounted to the housing with the back of the door facing the front of the housing;

a slide connection between the door and the housing for sliding of the door between a blocking position preventing access to the drive and an accessing position to allow access to the drive, the fronts of the housing and the door facing in the same general direction with the door in either the blocking or accessing position;

a gear drive between the door and housing having a gear wheel and a rack which meshes with the gear to provide smooth sliding of the door along the front of the housing; and wherein the door includes lateral edges having slide members that are preloaded in track guides, mounted on the housing, such that with the door slid to one of the positions the door preload keeps the door stationary preventing the door from sliding along the guides to the other position.

14. An apparatus having circuitry for performing computer operations, the apparatus comprising:

an elongate housing having a front and back and spaced ends;

at least one bay with an opening at the front of the housing for receiving a drive for a mass storage device in the housing for insertion of the device into the drive and into electrical communication with the circuitry;

a door having a front and back and being mounted to the housing with the back of the door facing the front of the housing;

a slide connection between the door and the housing for sliding of the door between a blocking position preventing access to the drive and an accessing position to allow access to the drive, the fronts of the housing and the door facing in the same general direction with the door in either the blocking or accessing position;

wherein the front of the housing includes an arcuate portion adjacent one its ends and the door has an arcuate shape for sliding over the housing arcuate portion and being generally complementary to the housing arcuate portion such that with the door slide toward the other end of the housing the door provides the front of the housing with an arcuate appearance, the front of the housing has a generally flat portion adjacent its other end and the bay is disposed along the housing flat portion so that the arcuate door is slid over the housing arcuate portion in its accessing position, and the door includes lateral edges having slide members that are preloaded in track guides, mounted on the housing, such that with the door slid to one of the positions the door preload keeps the door stationary preventing the door from sliding along the guides to the other position.

* * * * *